Sept. 27, 1960 G. P. MARSDEN 2,954,033
DEVICE FOR STORING AND CATALOGING SLIDES
Filed Oct. 30, 1956 2 Sheets-Sheet 1

INVENTOR.
GEORGE P. MARSDEN
BY
ATTORNEYS

2,954,033
DEVICE FOR STORING AND CATALOGING SLIDES

George P. Marsden, 12011 Galena Road, Rockville, Md.

Filed Oct. 30, 1956, Ser. No. 619,359

2 Claims. (Cl. 129—16)

(Granted under Title 35, U.S. Code (1952), sec. 266)

The invention described herein may be manufactured and used by or for the United States Government for governmental purposes without payment to me of any royalty thereon.

This invention relates to storage files for photographic slides, cards and the like, and means for protecting them from dirt, dust, soilage and breakage while permitting instant selection, removal, and return of any particular slide with the least possible inconvenience and handling.

An object of the invention is the provision of a slide holder for indexing photographic slides and similar objects in closely spaced face to face relation with means for protecting both faces of the slides against damage, breakage and soilage.

A further object is the provision of slide storage and spacer means for individual filing and selection of slides with selective means for elevation of the selected slide above the tops of other similar filed slides in a row of closely spaced sequence filed slides so that any selected slide can be readily elevated and removed from the row and then be constantly returned to the same position in the row after being viewed or projected in which the spacing means constitutes indexing means for locating the position of the slide in the row both during its removal from the row and during its absence, and its return to row.

A further object includes a slide indexing file or receptacle in which each slide in a row of slides is separated by a pair of protective plates disposed in substantially juxtaposed relation to the opposite surfaces of the slide with one of the spacers having a supporting foot or ledge at its bottom edge to support the bottom of the slide for elevation thereof to permit its manual removal independently of the other slides in the row, in which the foot maintains the space in the row between the other slides during the absence of the slide so as to permit its return to its indexed identical position in the row.

A further object includes a slide file receptacle for filing photographic slides and the like in which the slides are retained in a row in the receptacle and includes a plurality of triangular shaped stiff thin separators with their bases resting on the bottom of the receptacle and their sides disposed in juxtaposed relation to the opposite faces of the slides to protect the surfaces thereof from breakage, soilage and dirt, including means on the base of each separator which underlies each slide for elevation of that slide upon rocking of the triangular separator in the receptacle about one end of its base.

A further object is the provision of a rectangular receptacle having a width to snugly receive slides crosswise with spaced triangular sheet like stiff separator each having a laterally extending base resting on the bottom of the receptacle to support a slide thereon and extending across the receptacle from side to side in which each separator has one edge disposed normal to said base and in juxtaposed relation to one side of said receptacle with its opposite edge inclining upwardly from said base at an acute angle toward the opposite edge of the separator to form an actuating projection, whereby actuation of this projection in a direction away from the normal or vertical edge rocks the separator to act as a lever means to elevate a slide resting on the laterally extending base to a point above the upper edges of the remaining slides and the base function as a separator between the adjacent separators at opposite sides thereof to maintain these adjacent separators in properly spaced relation to receive the removed slide when it is returned, the depression of the base by the slide as it is returned rocking the separator to its initial position.

Other objects and advantages of the invetion will become apparent from the following description and accompanying drawings in which like reference characters refer to like parts in the several figures.

Drawings

Figure 1:
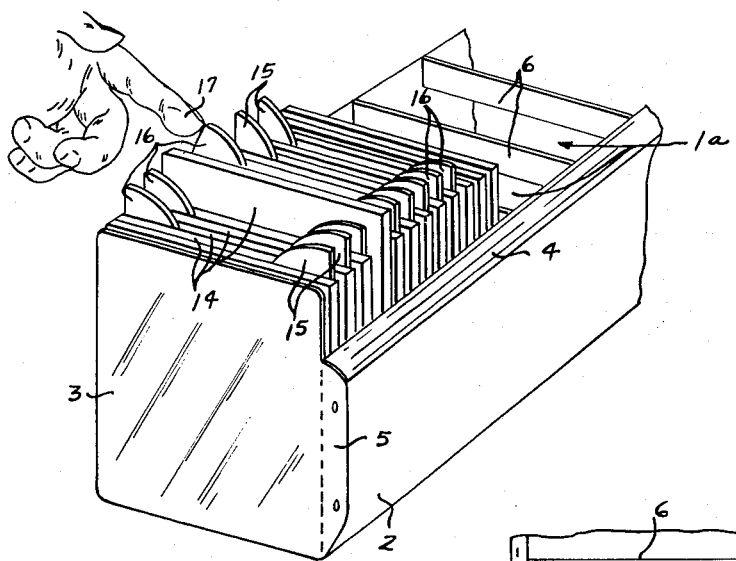
Figure 1 is a perspective view of a rectangular filing receptacle or box showing my invention incorporated therein.
Figure 2:
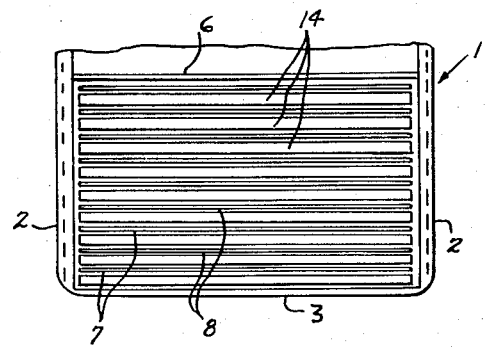
Figure 2 is a fragmentary top plan view of the end portion of the receptacle shown in Figure 1.
Figure 3:
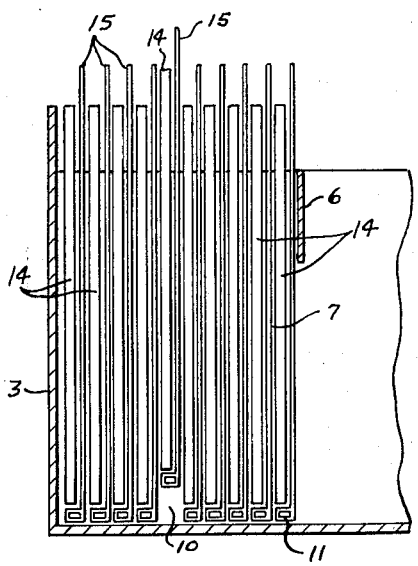
Figure 3 is a vertical longitudinal sectional view through the structure shown in Figure 1, with the slide or transparencies and the separators or slide elevator plates shown in elevation.

Referring more particularly to Figures 1 to 4 the reference numeral 1 denotes an open top rectangular receptacle having parallel side walls or panels 2 and end closures or plates 3. It may be made of light metal with the top edges rebent on themselves at 4 and the ends 3 provided with flanges 5 secured to the sides 2. Also, if desired, the receptacle 1 may be provided with transverse spacers or separators 6 extending between the side walls 2, dividing the receptacle or tray 1 into compartments 1ª.

The receptable 1, as illustrated in the drawings, is for the purpose of filing photographic transparencies such as 2" x 2" slides and is therefore only sufficiently wider between the vertical side walls 2 to receive the slides snugly slidable as shown in Figure 1 although the device can be made in different sizes to accommodate different size flat rectangular sheet like articles such as mounted photographic cards, lantern slides, etc.

Figure 5:
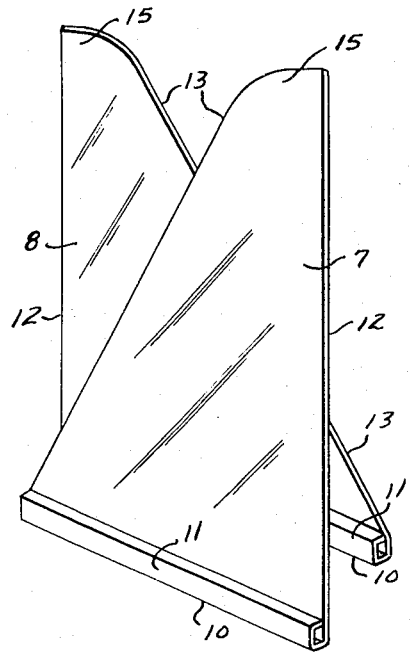
Figure 5 is a perspective view of two of the adjacent separators without the slides.

Mounted in each of the compartments 1ª between the partitions 6 are a plurality of triangular shaped separator slide elevator plates 7 and 8, stacked alternately as shown in the receptacle 1 in Figure 1 and separately in Figure 5.

Figure 4:
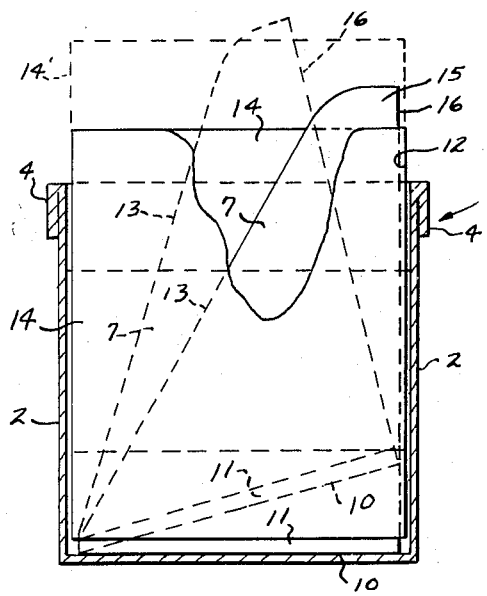
Figure 4 is a fragmentary vertical longitudinal sectional view through the receptacle adjacent one side thereof showing the separators and slides in elevation, with one separator actuated to displace a slide for its removal.

These separators 7 and 8 are preferably formed of thin stiff sheet material such as fibre, sheet aluminum, or steel and the like, provided with a base or bottom edge 10 having a rectangular slide supporting ledge or flange 11 adapted to normally rest on the bottom of the receptacle 1 as shown in Figure 4. One adjoining edge 12 is made normal to the base and adapted to normally lie in juxtaposed parallel relation to one of the sides 2 of the receptacle 1.

The other edge 13 or "hypotenuse" of the triangular spacers 7 and 8 inclines upwardly to a point above the top of the receptacle, above the top edges of the slides 14 and is somewhat truncated at its upper end to form a curved indexing actuating tab 15 with an actuating shoulder 16 adjacent the vertical edge 12. It should be noted that the tabs 15 are normally above the top edges of the slides 14 with the actuating shoulders 16 facing outwardly toward the sides of the receptacle where they may be easily and conveniently actuated or pushed toward the opposite side of the receptacle by a finger of the operator indicated at 17.

Actuation of any of the tabs 15 toward the center line of the receptacle as shown in Figures 1 and 4, rocks that separator lifter member around the corner end of the base 10 that joins the "hypotenuse" to elevate the other end of the base 11, rocking the supporting ledge or shelf 11 upwardly around this fulcrum point. The slide 14' resting on the ledge between the sides 2 in the receptacle 1 is lifted or slid upwardly above the other slides 14 as shown in Figures 1 and 4 where it can be readily grasped and lifted out of the space between the separators 7 and 8.

The rectangular ledge or flange 11 engages the back surface of the next separator on one side while the back of the tilted separator engages the next slide 14 thus holding the next slide and adjacent separator spaced away from each other so long as the separator 7 (or 8) is tilted. This maintains the desired separation or spacing between any two adjacent separators so that the slide, after being removed, can be conveniently returned to its proper indexed place in the receptacle 1. Depression of the slide by its top edge causes its bottom to engage the top of the supporting flange or ledge 11 and rock the indexing separator 7 (or 8) back to its initial position as shown in full lines in Figure 4.

The separators, being disposed at opposite sides of the slides, will adequately protect both sides of the slides from dust, damage and breakage, or from being soiled as would ordinarily occur in the handling of mounted slides, because they are raised high enough without touching to be easily gripped without contact with projection surface or the remaining slide. Also the separators 7 and 8 keep the slides apart so that there is less tendency for them to stick together when gummed bindings are used and the exposed edges of the slides are protected from being chipped during handling.

The tabs 15 not only serve to rock the lever type triangular separators to elevate the slides between the opposite longitudinal sides 2 of the receptacle but also project above the tops of the slides to protect the exposed edges of the slides, and they also furnish the user with a large vertical area for coding or widening and numbering of the slides and facilitates the returning as well as the locating of slides.

The base flange or supporting ledge 11 consists of a beading which is square or rectangular in cross section having a thickness equal to or very slightly in excess of the thickness of the slides and since the separators are made of very thin metal or stiff plastic sheets and preferably are no wider than the width of the slides they do not increase the width of the receptacle or cause a very little, if any, increase in length of the receptacle. The slides have a wide smooth bearing or sliding surface against the inside surfaces of the sides 2 of the receptacle 1 and therefore slide upwardly very easily as the separators are tilted.

Without further description it is thought that the features and advantages of the invention will be readily apparent to those skilled in the art, and it will of course be understood that changes in the form, proportion, and minor details of construction may be restored to without departing from the spirit and scope of the invention as defined in the appended claims.

I claim:

1. A storage device for flat articles comprising an open top, rectangular receptacle provided with a bottom and spaced, opposite side and end walls, said side walls being spaced apart a distance adapted to freely receive a plurality of the aforesaid flat articles in face to face relation with opposite edges of the articles disposed adjacent opposite side walls of the receptacle, a plurality of flat right triangular shaped article separators disposed in parallel relation with and between the end walls of the receptacle, each of said separators having a straight base edge extending between the opposite side walls of the receptacle, a perpendicular edge extending upwardly from one end of the base edge next to one side wall of said receptacle and an inclined edge inclining upwardly from the opposite end of said base edge toward the perpendicular edge of said separator, said inclined edge extending upwardly above the top of the receptacle to form with the perpendicular edge a projecting manipulating tab portion for the separator for rocking the separator on the bottom of the receptacle about the corner of the separator formed by the base edge and the inclined edge when the tab portion is moved in a direction in the plane of the separator toward the side wall of the receptacle remote from the vertical edge of the separator, and an article supporting ledge on each separator extending completely across one face of said separator adjacent said base edge in fixed parallel relation with said base edge, said ledge being adapted to receive and support the bottom edge portion of one of the flat articles.

2. A storage device for flat articles comprising an open top, rectangular receptacle provided with a bottom and spaced, opposite side and end walls, said side walls being spaced apart a distance adapted to freely receive a plurality of the aforesaid flat articles in face to face relation, with opposite edges of the articles disposed adjacent opposite side walls of the receptacle, a plurality of triangular shaped articles separators adapted for positioning in said receptacle said separators being disposed in parallel relation with and between the end walls of the receptacle, each of said triangular shaped separators having a straight base edge extending between the opposite side walls of the receptacle, one side edge of said triangular shaped separator extending upwardly from one end of the base edge and the other side edge of the separator inclining upwardly and inwardly of the receptacle from the opposite end of said base edge, said side edges of the separator extending above the top of the receptacle to form a projecting tab portion for rocking the separator on the bottom of the receptacle about at least one corner of the separator formed by the intersection of the ends of the base edge with the side edges, when the tab portion is moved in a direction in the plane of the separator toward a side wall of the receptacle, and an article supporting, laterally projecting ledge on each separator extending completely across the separator adjacent said base edge in fixed parallel relation with said edge, said ledge being adapted to receive and support one of the flat articles for storage in said receptacle.

References Cited in the file of this patent

UNITED STATES PATENTS 2,572,737     Lehner _____ Oct. 23, 1951

FOREIGN PATENTS 1,029     Great Britain _____ July 3, 1913